(12) United States Patent
Yamagishi et al.

(10) Patent No.: US 8,366,178 B2
(45) Date of Patent: Feb. 5, 2013

(54) VEHICLE AND VEHICLE SUBSTRUCTURE (75) Inventors: Kouichi Yamagishi, Susono (JP); Narito Fujii, Izunokuni (JP); Koushi Yamada, Odawara (JP); Shigenori Osada, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/681,708

(22) PCT Filed: Oct. 2, 2008

(86) PCT No.: PCT/IB2008/002581
§ 371 (c)(1),
(2), (4) Date: Jan. 11, 2011

(87) PCT Pub. No.: WO2009/044254
PCT Pub. Date: Apr. 9, 2009

(65) Prior Publication Data
US 2011/0095562 A1     Apr. 28, 2011

(30) Foreign Application Priority Data
Oct. 3, 2007  (JP) ................. 2007-260088

(51) Int. Cl.
*B62D 35/02* (2006.01)
(52) U.S. Cl. ..................... 296/180.1; 180/903
(58) Field of Classification Search .......... 105/1.1, 105/1.2, 1.3; 180/903; 296/180.1, 180.2, 296/180.3, 180.4, 180.5
See application file for complete search history.

(56) References Cited

U.S. PATENT DOCUMENTS

| | | | | | |
|---|---|---|---|---|---|
| 2,665,137 | A | * | 1/1954 | Kamm | 280/1 |
| 2,976,077 | A | * | 3/1961 | Totton, Jr. | 296/180.5 |
| 3,512,825 | A | * | 5/1970 | Green | 296/180.5 |
| 3,869,617 | A | * | 3/1975 | Gaussoin et al. | 280/851 |
| 3,952,823 | A | * | 4/1976 | Hinderks | 180/309 |
| 4,455,045 | A | * | 6/1984 | Wheeler | 296/181.5 |
| 4,486,046 | A | * | 12/1984 | Whitney et al. | 296/180.4 |
| 4,511,170 | A | * | 4/1985 | Sankrithi | 296/180.1 |
| 4,640,541 | A | * | 2/1987 | FitzGerald et al. | 296/180.1 |
| 4,772,060 | A | * | 9/1988 | Kretschmer | 296/180.1 |
| 4,778,212 | A | * | 10/1988 | Tomforde | 296/180.1 |
| 6,033,010 | A | * | 3/2000 | Preiss | 296/180.1 |
| 6,435,298 | B1 | | 8/2002 | Mizuno et al. | |
| 6,719,359 | B2 | * | 4/2004 | Steinicke et al. | 296/180.1 |

(Continued)

FOREIGN PATENT DOCUMENTS

DE   3711981 A1 * 10/1988
DE   4208999 A1 *  9/1993

(Continued)

OTHER PUBLICATIONS

Office Action issued Feb. 27, 2012, in Japanese Patent Application No. 2007-260088 with English translation.

*Primary Examiner* — Glenn Dayoan
*Assistant Examiner* — Paul Chenevert
(74) *Attorney, Agent, or Firm* — Oblon, Spivak, McClelland, Maier & Neustadt, L.L.P.

(57) ABSTRACT

A vehicle substructure (1) having a rectifying fin (10) that is attached under the floor of a car body and rectifies a flow of fluid under the floor of the car body, wherein the rectifying fin (10) is an airfoil fin that has a blade thickness in a right-to-left direction of a vehicle.

7 Claims, 5 Drawing Sheets

U.S. PATENT DOCUMENTS

| | | | |
|---|---|---|---|
| 7,854,469 B2 * | 12/2010 | Dayton | 296/180.4 |
| 8,256,826 B2 * | 9/2012 | Fioravanti | 296/181.5 |
| 2004/0155485 A1 * | 8/2004 | Hamnett | 296/180.1 |
| 2009/0146453 A1 * | 6/2009 | Ortega et al. | 296/180.4 |
| 2010/0066123 A1 * | 3/2010 | Ortega et al. | 296/180.4 |
| 2011/0272965 A1 * | 11/2011 | Henderson et al. | 296/180.4 |
| 2012/0013146 A1 * | 1/2012 | Wolf et al. | 296/180.5 |

FOREIGN PATENT DOCUMENTS

| | | |
|---|---|---|
| DE | 297 03 392 | 4/1997 |
| EP | 1 013 540 | 6/2000 |
| FR | 2538767 A1 * | 7/1984 |
| FR | 2575126 A1 * | 6/1986 |
| FR | 2 863 244 | 6/2005 |
| FR | 2 897 830 | 8/2007 |
| JP | 63145180 A * | 6/1988 |
| JP | 3 103882 | 10/1991 |
| JP | 05105124 A * | 4/1993 |
| JP | 2000-185673 | 7/2000 |
| JP | 2002-37144 | 2/2002 |
| JP | 2006-282076 | 10/2006 |
| JP | 2007-22488 | 2/2007 |

* cited by examiner

VEHICLE AND VEHICLE SUBSTRUCTURE

BACKGROUND OF THE INVENTION

1. Field of the Invention

This invention relates to a vehicle and a vehicle substructure for stabilizing a flow of fluid under the floor of a car body.

2. Description of the Related Art

Without any aerodynamic equipment provided under the floor of a car body, a flow of air under the floor of the car body cannot be stabilized and therefore cannot be diffused smoothly at a rear end of the vehicle. Consequently, stability of the vehicle is deteriorated and air resistance increases. For this reason, there exists a sports car provided with a diffuser at a rear end part of the floor of the car body and with a rectifying fin on a flat plate of the diffuser. Furthermore, in the structure described in Japanese Utility Model Application Publication No. 3-103882 (JP-U-3-103882), an under spoiler is provided horizontally in a lower position of a rear bumper that has a predetermined ventilation gap.

However, in the diffuser and the rectifying fin provided on the flat plate, not much change in the flow of air is observed and it is difficult to obtain a sufficiently stabilized air flow. Moreover, when forming the ventilation gap in the lower part of the rear bumper to provide the under spoiler, a certain ground clearance needs to be provided, which affects the departure angle. Therefore, the above-described structure cannot be adopted in a general automobile easily, as it is complicated and increases the air resistance.

SUMMARY OF THE INVENTION

Therefore, the invention is to provide a vehicle and a vehicle substructure for stabilizing a flow of fluid under the floor of a car body.

A vehicle substructure according to a first aspect of the invention includes a rectifying fin, which is an airfoil fin that is attached under a floor of a car body, rectifies a flow of fluid under the floor of the car body, and has a blade thickness in a right-to-left direction of a vehicle.

In this vehicle substructure, the airfoil fin is disposed under the floor of the car body. The airfoil fin is a fin having a cross-sectional shape with a blade-shaped plane. When provided under the floor of the car body, the airfoil fin is shaped such that a vehicle rear side thereof forms a sharp point, such that a front side thereof is curved more than the rear side, and such that the blade thickness is provided in the right-to-left direction of the vehicle. A front part and a rear part of the airfoil fin in a front-to-rear direction of the vehicle is short in a vehicle width direction, and a central part of the airfoil fin is longer than the front part and the rear part of the airfoil fin in the vehicle width direction. In this vehicle substructure, the action of the airfoil fin makes a flow of fluid (air) smooth under the floor of the car body and consequently increases the flow speed. Accordingly, not only is it possible to stabilize the flow of the fluid entering under the floor of the car body, but also it is possible to diffuse the flow of the fluid effectively. As a result, stability of the vehicle is improved even when the vehicle travels at high speeds, and air resistance is reduced.

According to the first aspect, the airfoil fin may be provided under the floor of the vehicle that has a rising angle formed by a road surface and the floor of which height from the road surface increases towards the vehicle rear side. The rising angle is an angle with respect to the road surface. The position on the vehicle rear side that has the rising angle becomes high with respect to the road surface, as the rising angle increases. Therefore, the airfoil fin becomes higher on the rear side (sharp point side) than the front side. In this vehicle substructure, the airfoil fin is provided in the section having the rising angle under the floor of the car body so that the flow of the fluid is made smoother and stabilized more. Particularly, the rising angle may be 4 to 6°. This rising angle of 4 to 6° is set in view of the vehicle speeds of a general automobile, the flow speed of the fluid under the floor of the car body, and the fluctuations in the vertical direction of the vehicle.

According to the first aspect, the airfoil fin may be provided under the floor on the vehicle rear side. In this vehicle substructure, because the airfoil fin is provided under the floor on the vehicle rear side where the flow of the fluid entering under the floor of the car body is diffused, the flow of the fluid can be diffused more effectively.

According to the first aspect, the airfoil fin may be shaped such that the maximum blade thickness ratio is set at 8 to 17% and the maximum blade thickness position at 30 to 35%. The maximum blade thickness ratio is the ratio of the maximum blade thickness to a chord length. The maximum blade thickness position is obtained by dividing a length between a front edge and the position corresponding to the maximum blade thickness by the chord length. In the vehicle substructure, by setting the maximum blade thickness ratio at 8 to 17% and the maximum blade thickness position at 30 to 35% as described above, the flow of the fluid is stabilized more. The maximum blade thickness ratio of 8 to 17% and the maximum blade thickness position of 30 to 35% are values for defining the shape of the blade that can make the flow of the fluid smooth, and are set in view of the shape of a general blade.

According to the first aspect of the invention, the airfoil fin provided under the floor of the car body can stabilize the flow of the fluid under the floor of the car body.

A vehicle according to a second aspect of the invention includes a structure protruding downward on a bottom surface of a vehicle body, wherein: the structure is provided further rearward than a center of the bottom surface of the vehicle body in a longitudinal direction of the vehicle; a longitudinal dimension of the structure along a longitudinal direction of the vehicle is longer than a lateral dimension of the structure along the lateral direction of the vehicle; and a central portion of the structure is wider than a front portion and a rear portion of the structure.

BRIEF DESCRIPTION OF THE DRAWINGS

The accompanying drawings and their exemplary depictions do not in any way limit the scope of the claims embraced by this specification. In particular, it is noted that the drawings are not to scale and are drawn as depicted for clarity. The foregoing and further objects, features and advantages of the invention will become apparent from the following description of example embodiments with reference to the accompanying drawings, wherein like numerals are used to represent like elements and wherein:

DETAILED DESCRIPTION OF EMBODIMENTS

Embodiments of the vehicle substructure according to the invention are now described hereinafter with reference to the drawings.

In this embodiment, the vehicle substructure of the invention is applied to a vehicle substructure of a general automobile. In the vehicle substructure according to this embodiment, two airfoil fins are provided on the vehicle rear side under the floor of a car body. This embodiment consists of two embodiments due to the difference in position to attach the airfoil fins, the first being an embodiment in which the airfoil fins are attached to a rear diffuser, and the second an embodiment in which the airfoil fins are attached to a rear part of a floor cover.

Figure 1:
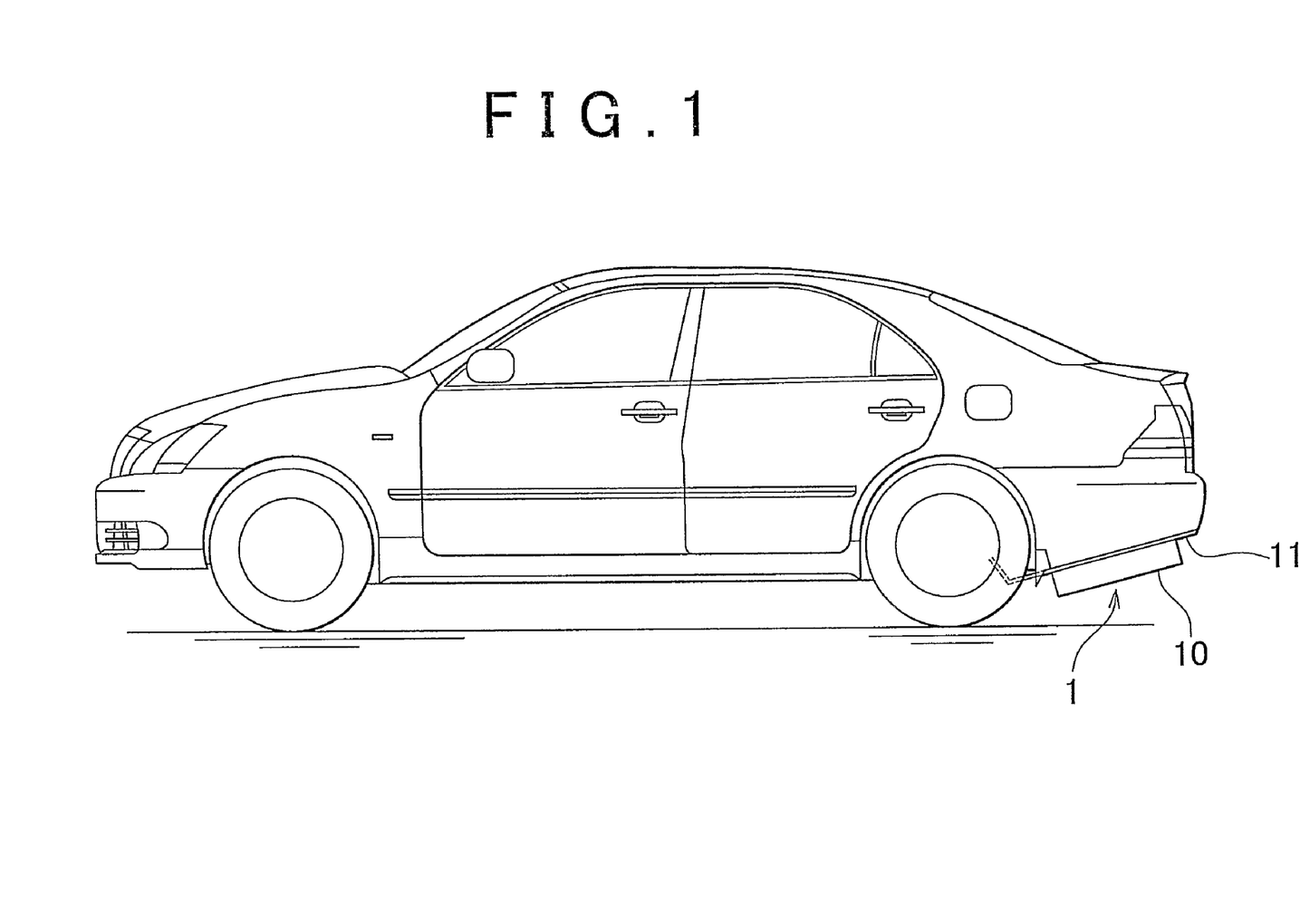
FIG. 1 is a side view of a vehicle having a vehicle substructure according to a first embodiment.
Figure 2:
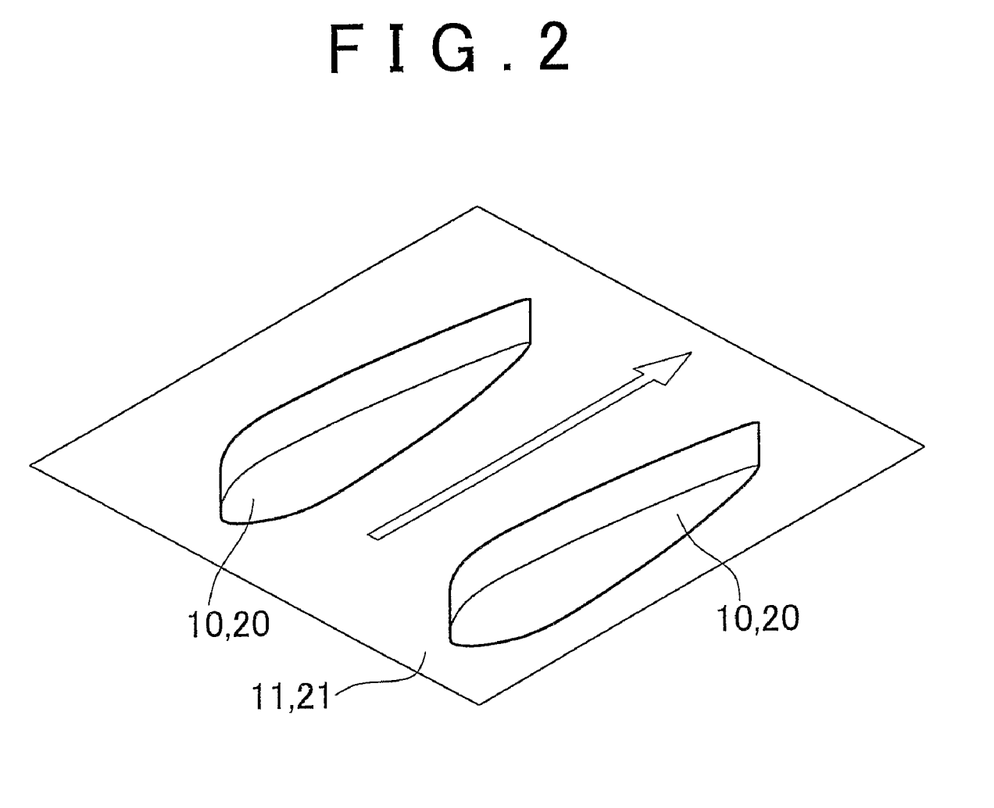
FIG. 2 is a perspective view of airfoil fins according to the first embodiment.
Figure 3:
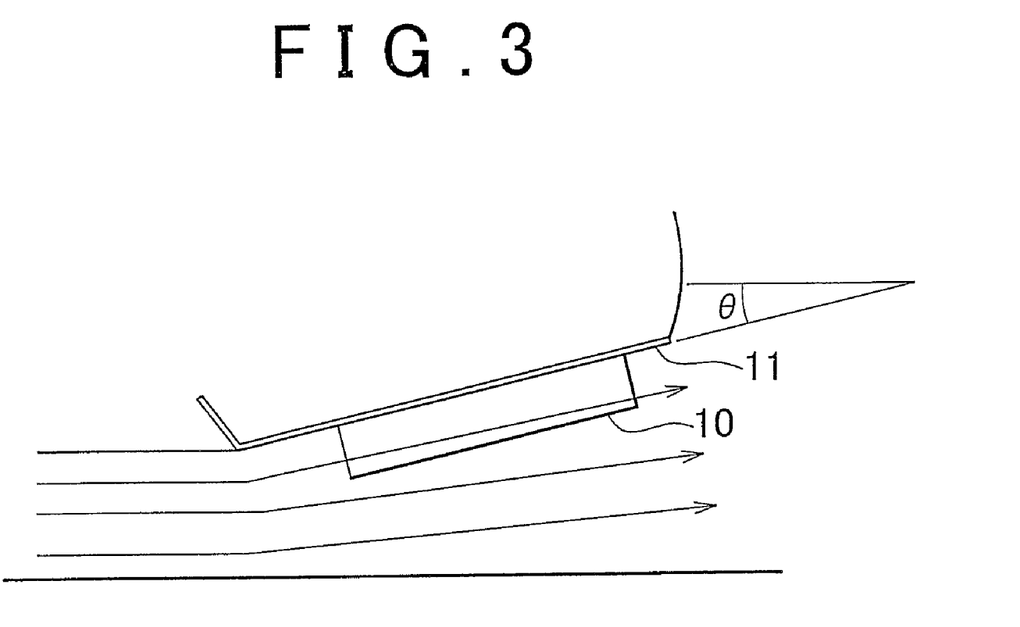
FIG. 3 is an enlarged view of the periphery of one of the airfoil fins shown in FIG. 1.
Figure 4:
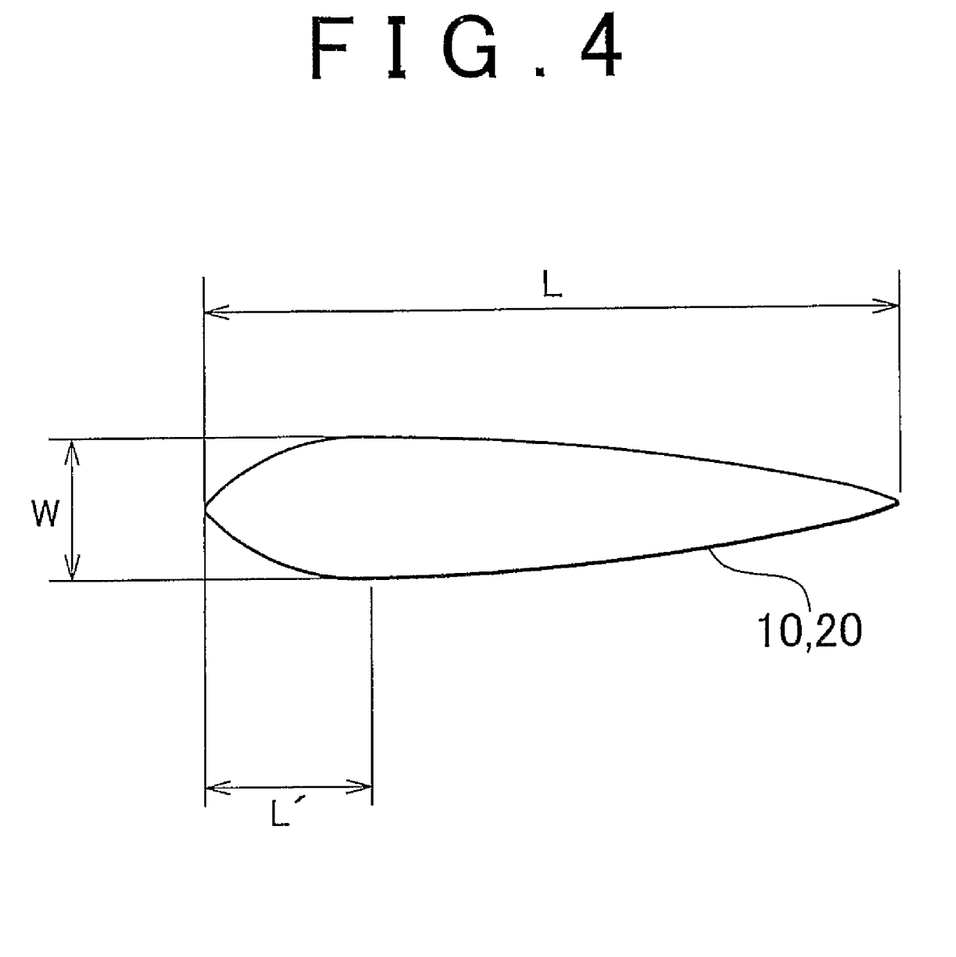
FIG. 4 is a plan view of one of the airfoil fins according to the first embodiment.

A vehicle substructure 1 according to the first embodiment is described with reference to FIGS. 1 to 4. FIG. 1 is a side view of a vehicle having the vehicle substructure according to the first embodiment. FIG. 2 is a perspective view of the airfoil fins according to the first embodiment. FIG. 3 is an enlarged view of the periphery of one of the airfoil fins shown in FIG. 1. FIG. 4 is a plan view of one of the airfoil fins according to the first embodiment.

The vehicle substructure 1 has an aerodynamic structure for stabilizing a flow of air under the floor of the car body. Therefore, the vehicle substructure 1 is configured such that two airfoil fins 10, 10 are provided in a rear diffuser 11.

Each airfoil fin 10 is a fin having a cross-sectional-shape with a blade-shaped plane (a fin whose horizontal cross section forms a blade) and has a predetermined height. When attached to the vehicle, the planar shape of the airfoil fin 10 is bilaterally symmetric with respect to right-to-left and front-to-rear directions of the vehicle, wherein the shape of the fin on the vehicle rear side is pointier than the shape of the fin, on the vehicle front side, and the shape of the fin on the vehicle front side is curved more than the shape of the fin on the vehicle rear side as shown in FIG. 4. A front part and a rear part of the airfoil fin in a front-to-rear direction of the vehicle is short in a vehicle width direction, and a central part of the airfoil fin is longer than the front part and the rear part of the airfoil fin in the vehicle width direction (the horizontal cross section of the airfoil fin on the vehicle rear side may be pointier than that on the vehicle front side, and the horizontal cross section of the airfoil fin on the vehicle front side may be curved more than that on the vehicle rear side). Therefore, the blade thickness of the airfoil fin 10 (the width in the right-to-left direction of the vehicle) gradually increases from a front edge towards a position having the maximum blade thickness W and gradually decreases from the position having the maximum blade thickness W towards a rear edge.

The planar shape of the airfoil fin 10 is configured such that the maximum blade thickness ratio is set within a range of 8 to 17% and the maximum blade thickness position within a range of 30 to 35%. The maximum blade thickness ratio is the ratio of the maximum blade thickness W to a chord length L (the length of a straight line connecting the front edge of the airfoil fin and the rear edge of the airfoil fin), and the smaller the value of the maximum blade thickness ratio, the thinner the airfoil fin. The maximum blade thickness position is obtained by dividing a length L' between the front edge and the position corresponding to the maximum blade thickness W by the chord length L. The smaller the value of the maximum blade thickness position, the closer the maximum blade thickness position is to the front edge side, and the rear edge side has a pointy shape. The maximum blade thickness ratio of 8 to 17% and the maximum blade thickness position of 30 to 35% are values for defining the shape of the blade that can make the flow of the air smooth under the floor of the car body, and are set in view of the shape of a general blade.

The diffuser 11, a rectifying plate, is provided in a section under the floor of the car body where the flow of the air is diffused. The diffuser 11 is disposed such that a rising angle $\theta$ thereof with respect to a road surface falls within a range of 4 to 6°, as shown in FIG. 3. The section with the rising angle $\theta$ gradually rises from the road surface towards the vehicle rear side. Therefore, the greater the rising angle $\theta$ is, the higher the rear side of the diffuser 11 rises with respect to the road surface. This rising angle of 4 to 6° is set in view of the vehicle speeds of the general automobile, the flow speed of the air under the floor of the car body, and the fluctuations in the vertical direction of the vehicle, and is set by experiment.

The diffuser 11 is attached to a central part of a bottom surface of a rear bumper and has the rising angle $\theta$ along the bumper. This diffuser 11 has the two airfoil fins 10, 10 attached thereto extending parallel to the front-to-rear direction of the vehicle, with the pointy parts facing the rear side of the vehicle. Therefore, the airfoil fins 10, 10 are also positioned in the section where the flow of the air is diffused under the floor of the car body, and have the rising angle equal to the angle of the diffuser 11, and the rear edge of each airfoil fin 10 is positioned higher than the front edge of the airfoil fin 10.

In the vehicle substructure 1 having the configuration described above, air that enters under the floor of the car body from a front end of the vehicle while the vehicle is running can be caused to flow smoothly by the airfoil fins 10, 10, whereby the flow speed of the air increases. As a result, the flow of the air is stabilized under the floor of the car body and diffused smoothly at a rear end of the vehicle.

According to this vehicle substructure 1, the flow of the air can be stabilized by providing the airfoil fins 10, 10 in the rear diffuser 11. As a result, stability of the vehicle is improved even when the vehicle travels at high speeds, and air resistance is reduced.

Particularly, in the vehicle substructure 1, the flow of the air can be made smoother and stabilized more by providing the airfoil fin 10, 10 in the diffuser 11 having a rising angle $\theta$ of 4 to 6°. Moreover, in the vehicle substructure 1, the planar shape of each airfoil fin 10 is configured such that the maximum blade thickness ratio is set at 8 to 17% and the maximum blade thickness position at 30 to 35%, whereby the flow of the air can be made smoother and stabilized more. In addition, in the vehicle substructure 1, the flow of the air is diffused more effectively under the floor of the car body by providing each airfoil fin 10 in the diffuser 11 disposed on the rear side of the floor of the car body.

Figure 5:
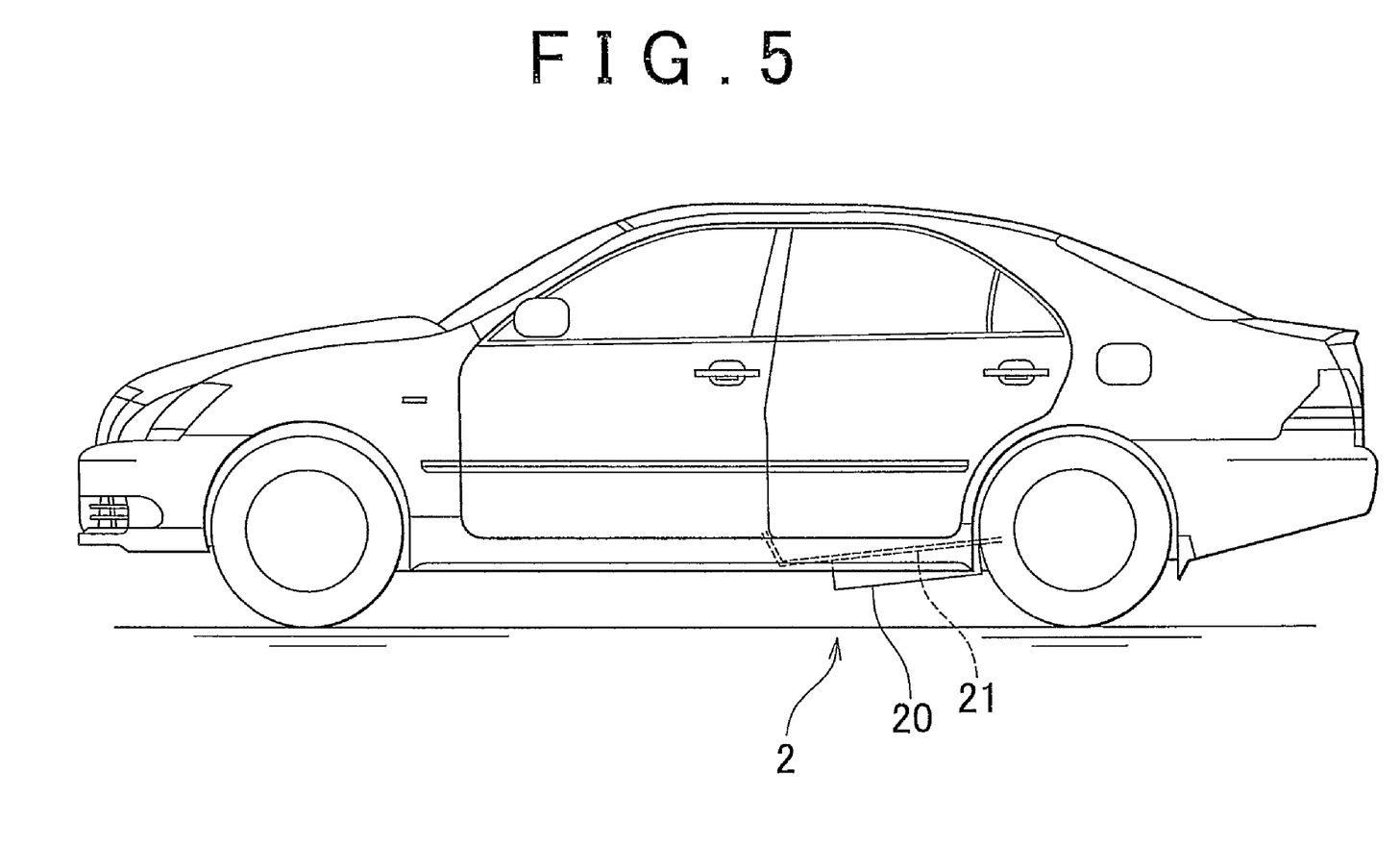
FIG. 5 is a side view of a vehicle having a vehicle substructure according to a second embodiment.

A vehicle substructure 2 according to a second embodiment is now described with reference to FIG. 5. FIG. 5 is a side view of a vehicle having the vehicle substructure according to the second embodiment.

The only difference between the vehicle substructure 2 and the vehicle substructure 1 according to the first embodiment is that position to attach the airfoil fins. In the vehicle substructure 2, two airfoil fins 20, 20 are provided in a floor cover 21. Note that the floor cover of the second embodiment is divided into a front seat side and a rear seat side.

The floor cover 21 is the rear seat side floor cover that covers the floor of the car body. As shown in FIG. 5, the floor cover 21 is attached to the rear seat side under the floor of the car body at a rising angle $\theta$ of 4 to 6° with respect to the road surface. This floor cover 21 has the two airfoil fins 20, 20 attached thereto extending parallel to the front-to-rear direction of the vehicle, with the pointy parts facing the rear side of the vehicle. Therefore, the airfoil fins 20, 20 also have the rising angle equal to the angle of the floor cover 21, and the rear edge of each airfoil fin 20 is positioned higher than the front edge of the airfoil fin 20.

As with the vehicle substructure 1 according to the first embodiment, in the vehicle substructure 2 having the above configuration, the flow of the air is made smooth and stabilized under the floor of the car body by the airfoil fins 20, 20, whereby the flow of the air is diffused smoothly at the rear end of the vehicle.

In this vehicle substructure 2 as well, the same effects as in vehicle substructure 1 of the first embodiment can be achieved.

The fins are disposed further rearward than the center of the bottom surface of the vehicle in the longitudinal direction of the vehicle. Each of the fins may be disposed such that at least part of the fin is positioned in a region, further rearward than the rear wheel(s), on the bottom surface of the vehicle.

The above has described the embodiments of the invention, but the invention is not limited to these embodiments but can be modified in various ways.

For example, the invention is applied to a general automobile in these embodiments, but it can be applied to various types of cars (e.g., a sports car).

Moreover, although two airfoil fins are provided in these embodiments, the number of the airfoil fins is not particularly limited. Therefore, one or three airfoil fins may be provided. Note that, in view of air resistance, it is better not to provide too many airfoil fins.

The embodiments have described one example of the shape of the airfoil fins, but the airfoil fins may have any shape as long as the cross-sectional shape thereof has a blade-shaped plane. For example, the top surface and the bottom surface may not be the same size, and therefore each airfoil fin may be formed into a trapezoidal shape in a lateral view where the bottom surface is larger than the top surface. The planar shape may not be bilaterally symmetric but bilaterally asymmetric.

Although the airfoil fins are provided in the rear diffuser and the floor cover in the embodiments, they may be provided in other section that can diffuse and stabilize the flow of air under the floor of the car body.

Moreover, the airfoil fins are provided in the diffuser and the like having a rising angle of 4 to 6° in these embodiments, but the airfoil fins may be provided in a section with no rising angle or having a rising angle other than 4 to 6°. In the case of a sports car, for example, it is desired to provide a slightly larger rising angle.

In addition, the airfoil fins of these embodiments are shaped such that the maximum blade thickness ratio is set at 8 to 17% and the maximum blade thickness position at 30 to 35%, but the maximum blade thickness ratio and the maximum blade thickness position may be set at other values.

The invention claimed is:

1. A vehicle substructure, comprising:
 a rectifying fin, which is an airfoil fin that is attached under a floor of a car body, rectifies a flow of fluid under the floor of the car body, and has a blade thickness in a right-to-left direction of a vehicle,
 wherein a horizontal cross section of the airfoil fin on a vehicle rear side is pointier than that on a vehicle front side, and the horizontal cross section of the airfoil fin on the vehicle front side is curved more than that on the vehicle rear side,
 wherein the airfoil fin is provided under the floor of the vehicle that has a rising angle in relation to a road surface and the floor of which height from the road surface increases towards the vehicle rear side,
 wherein the rising angle is 4 to 6°,
 wherein the airfoil fin is provided under the floor on a rear side of the car body,
 wherein the airfoil fin is directly attached to a diffuser or a floor cover under the floor on a rear side of the car body; and
 wherein the airfoil fin is shaped such that a maximum blade thickness ratio is set at 8 to 17% and a maximum blade thickness position is 30 to 35%.

2. The vehicle substructure according to claim 1, wherein a front part and a rear part of the airfoil fin in a front-to-rear direction of the vehicle is short in a vehicle width direction, and a central part of the airfoil fin is longer than the front part and the rear part of the airfoil fin in the vehicle width direction.

3. The vehicle substructure according to claim 1, wherein the airfoil fin is attached to the diffuser.

4. The vehicle substructure according to claim 1, wherein the airfoil fin is attached to the floor cover.

5. A vehicle, comprising:
 a structure protruding downward on a bottom surface of a vehicle body, wherein:
 the structure is provided further rearward than a center of the bottom surface of the vehicle body in a longitudinal direction of the vehicle;
 a longitudinal dimension of the structure along a longitudinal direction of the vehicle is longer than a lateral dimension of the structure along the lateral direction of the vehicle;
 a central portion of the structure is wider than a front portion and a rear portion of the structure; and
 a widest portion of the structure is positioned further forward than a center of the structure in a longitudinal direction of the structure,
 wherein the structure is provided under a floor of the vehicle that has a rising angle in relation to a road surface and the floor of which height from the road surface increases towards a vehicle rear side,
 wherein the rising angle is 4 to 6°,
 wherein the structure is provided under the floor on a rear side of the car body, and
 wherein the structure is shaped such that a maximum blade thickness ratio is set at 8 to 17% and a maximum blade thickness position is 30 to 35%.

6. The vehicle according to claim 5, wherein a portion of the bottom surface of the vehicle body at which the structure is positioned is inclined such that the rear portion of the structure is positioned higher than the front portion in the longitudinal direction of the vehicle.

7. A vehicle substructure, comprising:
 a rectifying fin, which is an airfoil fin that is attached under a floor of a car body, rectifies a flow of fluid under the floor of the car body, and has a blade thickness in a lateral direction of a vehicle,
 wherein a longitudinal dimension of the rectifying fin along a longitudinal direction of the vehicle is longer than a lateral dimension of the rectifying fin along the lateral direction of the vehicle;
 a central portion of the rectifying fin is wider than a front portion and a rear portion of the rectifying fin;
 the front portion of the rectifying fin includes a first curved surface and the rear portion of the rectifying fin includes a second curved surface along the longitudinal direction of the vehicle; and
 a curvature of the first curved surface and that of the second curved surface is different,
 wherein the rectifying fin is provided under the floor of the vehicle that has a rising angle in relation to a road surface and the floor of which height from the road surface increases towards a vehicle rear side,
wherein the rising angle is 4 to 6°,
wherein the rectifying fin is provided under the floor on a rear side of the car body, and
wherein the rectifying fin is shaped such that a maximum blade thickness ratio is set at 8 to 17% and a maximum blade thickness position is 30 to 35%.

* * * * *